Nov. 13, 1951     J. H. MASON     2,574,648
RAIL CONNECTOR

Filed May 1, 1946     2 SHEETS—SHEET 1

INVENTOR.
JOE H. MASON
BY
Oberlin & Limbach
ATTORNEYS

Nov. 13, 1951   J. H. MASON   2,574,648
RAIL CONNECTOR

Filed May 1, 1946   2 SHEETS—SHEET 2

INVENTOR.
JOE H. MASON
BY
Oberlin & Limbach
ATTORNEYS

Patented Nov. 13, 1951

2,574,648

UNITED STATES PATENT OFFICE 2,574,648

RAIL CONNECTOR

Joe H. Mason, Ponca City, Okla., assignor to Continental Oil Company, Ponca City, Okla., a corporation of Delaware Application May 1, 1946, Serial No. 666,353

2 Claims. (Cl. 287—91)

This invention relates, as indicated, to rail connectors, and more especially to the type of connector used for the purpose of joining sections of pipe or similar tubular or cylindrical articles used most generally as hand rails wherever a safety rail is required as, for example, around the walks on tank cars, loading platforms, as well as around various locations in buildings.

Connectors of the prior art on which the present invention is an improvement generally fall into two classes: first, those which comprise a conventional pipe union; and second, those which utilize right- and left-hand threads respectively on the adjacent ends of the pipe or rail sections to be joined.

The first type is disadvantageous not only from the standpoint of cost but also because where the connection is made there is an undesirable enlargement in the rail.

The second type of connection is undesirable in that special threading tools are necessary and there is always a certain degree of confusion in insuring that the proper ends of the rails or pipes are brought adjacent to each other. While this second type has none of the disadvantages of the first type, nevertheless its own disadvantages militate against its general usage.

It is the principal object of my invention to provide a connector of the class described which can be utilized with pipes or rails in which both ends are provided with right-hand threads and which connector does not produce an undesirable enlargement in the rail at the place where it is located. Other objects of the invention will appear as the description proceeds.

To the accomplishment of the foregoing and related ends, the invention, then, comprises the features hereinafter fully described, and particularly pointed out in the claims, the following description and the annexed drawings setting forth in detail certain illustrative embodiments of the invention, these being indicative, however, of but a few of the various ways in which the principle of the invention may be employed.

In said annexed drawings—

Figure 1:
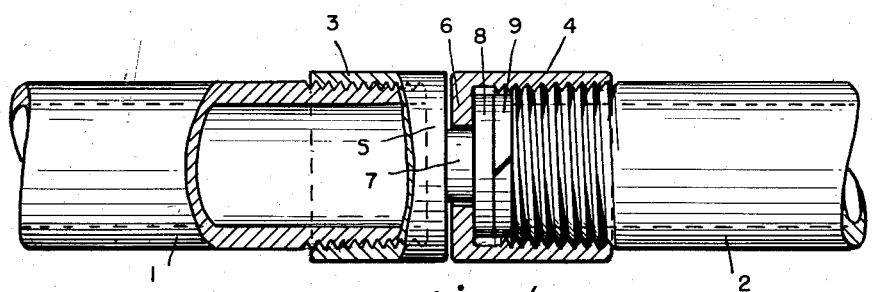
Fig. 1 is a part section, part side elevational view of a connector comprising one embodiment of my invention.

Referring now more specifically to the drawings, and more especially to Fig. 1, the rail connector comprising my invention is adapted to connect juxtaposed pipes or rails 1 and 2, each of which is terminally provided with a right-hand thread. The connector illustrated in Fig. 1 comprises two sleeves 3 and 4 respectively. These sleeves are internally threaded and are adapted to be threaded onto the ends of the pipes 1 and 2 respectively. These sleeves 3 and 4 are respectively provided with radially inwardly extending flanges 5 and 6.

In the embodiment illustrated in Fig. 1, the flange 5 has formed integrally therewith a stud 7 which extends axially through the flange 6 and is terminally provided with an upset enlarged head 8. The form of construction illustrated in Fig. 1 may be made by first providing the sleeve 4 as shown in the drawing and also providing the sleeve 3 with the stud 7 cylindrical and of a length sufficient so that when it is terminally heated, it may be upset to form the enlarged head 8 after the sleeve 4 is assembled on such stud.

When the connector is assembled onto the pipe ends, as illustrated in Fig. 1, it may be desirable on occasion to insert between the end of the pipe 2 and the head 8 a split spring lock washer 9 whereby, when the pipe 2 is threaded into the sleeve 4, the lock washer forces the head 8 against the sleeve 6 and locks the parts against accidental displacement due to vibration such as occurs when the rail is used on the walk on a tank car. If desired, a similar lock washer may be employed between the end of the pipe 1 and the flange 5.

Figure 2:
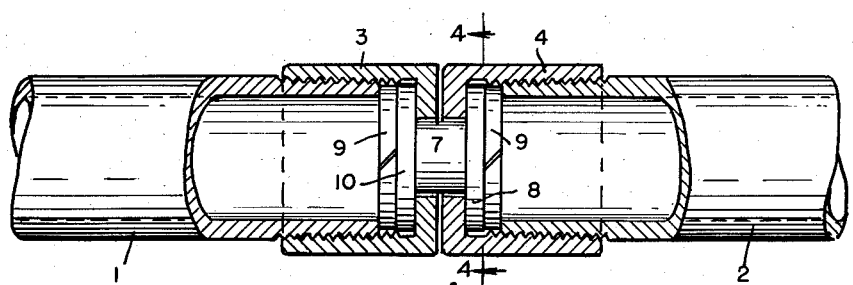
Fig. 2 is a view similar to Fig. 1 but showing an alternative form of construction.
Figure 3:
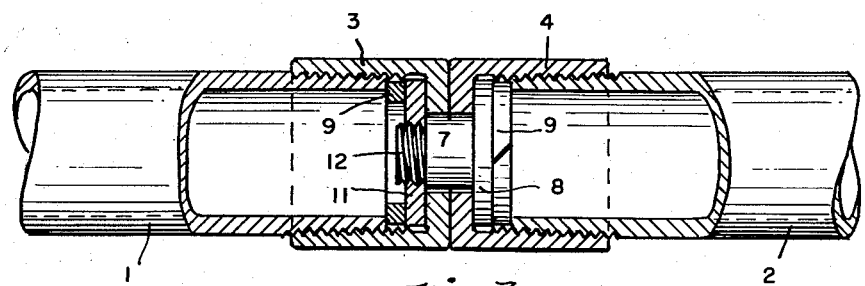
Fig. 3 is a view similar to Fig. 1, showing still another modified form of my invention.
Figure 4:
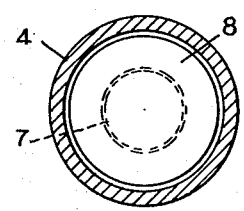
Fig. 4 is a transverse sectional view of the structure illustrated in Fig. 2 taken on a plane substantially indicated by the line 4—4.

The modification illustrated in Fig. 2 is generally similar to that shown in Fig. 1, and accordingly like reference characters will be employed to designate like parts. In the construction illustrated in Fig. 2, the stud 7, instead of being formed integral with the flange 5, is formed separately with an integral head 10 thereon. In all other respects the construction is the same and the assembly and function of the parts is generally similar. The construction illustrated in Fig. 3 is somewhat similar to the construction illustrated in Fig. 2 except one of the heads 11 on the stud 7 is threaded on a reduced threaded end 12 on such stud. The shoulder at the end of the threads 12 and against which the nut or head 11 seats is spaced from the head 8 by a distance equal to the thickness of the two flanges 5 and 6. When employing the construction illustrated in Fig. 3, the parts may be drawn together somewhat more tightly than in the case of either of the previously illustrated and described forms.

Figure 5:
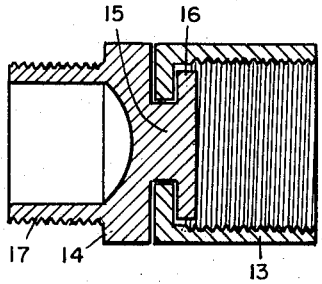
Fig. 5 is a longitudinal sectional view showing a further modification of my invention.

In Fig. 5 is illustrated a further modification embodying the principles of my invention and in which the member 13 is similar to the member 4 of Figs. 1 to 4. The other component part of the device, i. e. member 14, is generally similar to member 3 of the previously described construction in that it is provided with an extension 15 projecting into the member 13 and having an enlargement 16 formed thereon serving the same function as the head 8 of the previously described structures. The member 14, however, is provided with an extension 17 having an external thread thereon so that by the use of the structure illustrated in Fig. 5 the same may be connected directly with one of the elements of a coupling assembly such as for example those illustrated in the previous figures or to any other device which is provided with an internal thread.

There are many occasions where limited space might preclude the ready assembly of a structure such as those illustrated in Figs. 1 to 5. There are also instances where a quick detachment of a rail or pipeline at a point intermediate of its length is highly desirable. In such cases a structure like either of those illustrated in Figs. 6 to 10 may be employed.

Figure 6:
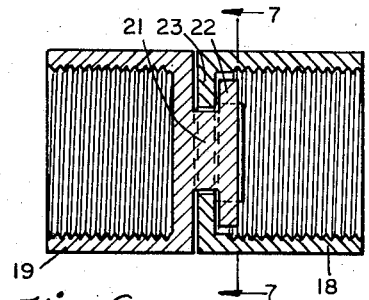
Fig. 6 is a longitudinal sectional view of another modified form of my invention.
Figure 7:
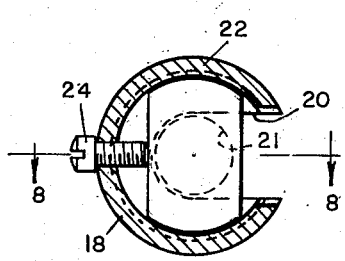
Fig. 7 is a transverse sectional view of the structure illustrated in Fig. 6 taken on a plane substantially indicated by the line 7—7.
Figure 8:
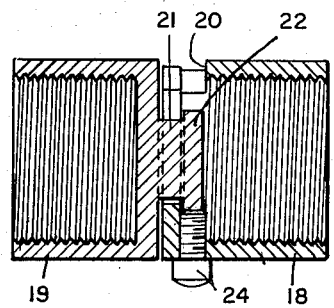
Fig. 8 is a transverse sectional view of the structure illustrated in Fig. 7 taken on a plane substantially indicated by the line 8—8.

The structure illustrated in Figs. 6 to 8 comprises member 18 formed generally like the member 4 of Fig. 1 and a member 19 formed generally like the member 3 of Fig. 1. The member 18, however, is provided with a slot generally indicated at 20 in Fig. 7 which extends from the opening, through which projects the extension 21 on the member 19, radially outwardly through the wall of the member 18. The enlargement 22 on the end of the projection 21 is generally disc-like in shape excepting that it has two opposite chordal sections omitted.

At this point it should be noted that preferably the distance between the chords on the enlargements 21 is slightly greater than the diameter of the projection 21, and that the slot 20 where it passes outwardly through the lateral wall of the member 18 is by substantially the same amount wider than that portion of the slot which extends through the end wall 23 of the member 18.

As most clearly illustrated in Figs. 7 and 8, the member 18 is provided with a threaded opening extending radially through the wall thereof and in which is mounted a set-screw 24, the inner end of which is adapted to bear against one of the flat faces of the enlargement 22. The modification illustrated in Figs. 6 to 8 is assembled by having the parts positioned relatively to each other so that the enlargement 22 is displaced ninety degrees from the position in which it is shown in Fig. 7. The members 18 and 19 may then be moved laterally relatively to each other until the projection 21 is in the bottom of the slot 20, whereupon the parts are rotated relatively to each other for ninety degrees, or more specifically, to the position illustrated in Fig. 7, whereupon the set-screw is inserted to hold the parts against relative rotation.

Figure 9:
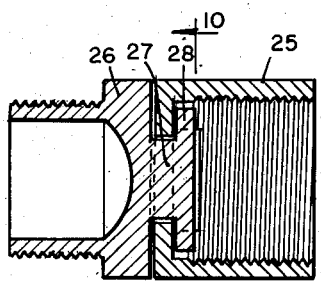
Fig. 9 is a longitudinal sectional view of another modification of my invention.
Figure 10:
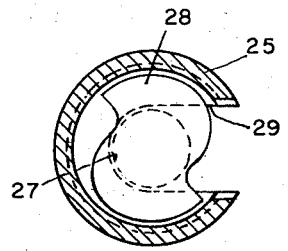
Fig. 10 is a transverse sectional view of the structure illustrated in Fig. 9 taken on a plane substantially indicated by the line 10—10.

A somewhat similar arrangement is illustrated in Figs. 9 and 10. In this construction, the member 25 may be substantially identical with the member 18 of the modification illustrated in Figs. 6 to 8. The other portion of the coupling, i. e. member 26, is similar to member 14 of the structure illustrated in Fig. 5, excepting that the projection 27 has an enlargement 28 which is a substantially S-shaped disc as most clearly illustrated in Fig. 10. The two component parts of this modified form of my invention are assembled similarly to the manner just described in connection with Figs. 6 to 8 excepting that during the relative lateral movement, whereby the two parts are brought into axial alignment during the assembly operation, it is necessary to simultaneously relatively rotate such members so that the S-shaped projection 28 may be moved through the slot 29 in the member 25.

The modification comprising the S-shaped projection 28 may be employed with certain of the other modified forms of my invention as for example instead of being a part of a member such as 26 having a male thread thereon, it may be part of a member having a female thread like member 19 in Fig. 6.

The structures illustrated and described as embodying my invention are in each instance a straight-line coupling. It will be observed that these same principles may be employed in the fabrication of connections which serve as T's, L's, and crosses.

In the case of a T, one of the members such as for example sleeve 3 in Fig. 1 would have formed thereon, and preferably integrally therewith, a laterally extending branching with a flange corresponding to flange 5 to which could be secured another sleeve such as 4 in precisely the same manner in which sleeve 4 is secured to sleeve 3.

In the provision of an L, the only modification required would be to provide a bend to a suitable angle in the sleeve 3.

In providing a cross, a duplicate of the modification described above in providing a T would be utilized.

Other modes of applying the principle of the invention may be employed, change being made as regards the detail described, provided the features stated in any of the following claims, or the equivalent of such, be employed.

I therefore particularly point out and distinctly claim as my invention:

1. A connector for the juxtaposed threaded extensions of articles to be coupled, comprising two coupling members each threaded to engage a threaded extension of such an article, the first of such coupling members provided with an opening in its end opposite its threaded portion, such opening bounded by a radially extending flange, the second of said coupling members provided with an extension adapted to project through said opening in the first member, an enlargement on the end of said extension adapted to engage the radially extending face of said flange and thus secure said coupling members against axial displacement, the first coupling member provided with a radial slot extending outwardly from its said opening through said flange and the adjacent wall whereby said coupling members may be assembled by relative lateral movement therebetween, and a set-screw extending radially through the wall of said first member and substantially into engagement with said enlargement.

2. A connector for the juxtaposed threaded extensions of articles to be coupled, comprising two coupling members each threaded to engage a threaded extension of such an article, the first of such coupling members provided with an opening in its end opposite its threaded portion, such opening bounded by a radially extending flange, the second of said coupling members provided with an extension adapted to project through said opening in the first member, an enlargement on the end of said extension adapted to engage the radially extending face of said flange and thus secure said coupling members against axial displacement, the first coupling member provided with a radial slot extending outwardly from its said opening through said flange and the adjacent wall whereby said coupling members may be assembled by relative lateral movement therebetween, the enlargement on the extension of said second member being a disc with opposite substantially chordal sections omitted.

JOE H. MASON.

REFERENCES CITED

The following references are of record in the file of this patent:

UNITED STATES PATENTS

| Number | Name | Date |
| --- | --- | --- |
| 81,270 | Good, Jr., et al. | Aug. 18, 1868 |
| 1,431,286 | Brown | Oct. 10, 1922 |
| 1,431,513 | Cox | Oct. 10, 1922 |
| 2,161,501 | Blackmon | June 6, 1939 |
| 2,464,743 | Evans et al. | Mar. 15, 1949 |